United States Patent
Shapourian

(10) Patent No.: US 12,373,722 B2
(45) Date of Patent: Jul. 29, 2025

(54) SINGLE-SHOT GRAPH STATE GENERATOR

(71) Applicant: Cisco Technology, Inc., San Jose, CA (US)

(72) Inventor: Hassan Shapourian, San Mateo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 105 days.

(21) Appl. No.: 18/497,072

(22) Filed: Oct. 30, 2023

(65) Prior Publication Data

US 2025/0139480 A1    May 1, 2025

(51) Int. Cl.
*G06N 10/40* (2022.01)
*G06N 10/20* (2022.01)

(52) U.S. Cl.
CPC ............. *G06N 10/40* (2022.01); *G06N 10/20* (2022.01)

(58) Field of Classification Search
CPC ......... G06N 10/20; G06N 10/40; H03K 17/92
USPC .................................. 327/527, 528
See application file for complete search history.

(56) References Cited

U.S. PATENT DOCUMENTS

| | | |
|---|---|---|
| 2007/0252081 A1 | 11/2007 | Munro et al. |
| 2022/0224996 A1 | 7/2022 | Nickerson et al. |
| 2023/0042201 A1 | 2/2023 | Raussendorf et al. |
| 2023/0188221 A1 | 6/2023 | Gimeno-Segovia et al. |
| 2023/0267359 A1* | 8/2023 | Semo ............... G06N 10/40 716/100 |

* cited by examiner

*Primary Examiner* — Tomi Skibinski
(74) *Attorney, Agent, or Firm* — Edell, Shapiro & Finnan, LLC

(57) ABSTRACT

A single-shot graph state generator prepares matter qubits in an entangled graph state. Each matter qubit may be in a first state, a second state, or an excited state. The single-shot graph state generator drives the matter qubits with one or more pulses that cause a transition from the first state to the excited state. A decay of a matter qubit from the excited state to the first state generates a corresponding photonic qubit. The single-shot graph state generator measures the matter qubits to teleport the entangled graph state to the photonic qubits.

20 Claims, 6 Drawing Sheets

SINGLE-SHOT GRAPH STATE GENERATOR

TECHNICAL FIELD

The present disclosure relates to quantum computation and communication, specifically using graph/resource states.

BACKGROUND

Quantum photonics offer an efficient and scalable solution for quantum information processing. Measurement-based techniques for quantum networking and computing process photons in resource states, e.g., graph states. The lack of nonlinearities for implementing logic gates for photonic qubits presents challenges to deterministically generating of photonic resource states.

DETAILED DESCRIPTION

Overview

A method is provided for generating photonic graph states for quantum information processing. The method includes preparing a plurality of matter qubits in an entangled graph state. Each matter qubit may be in a first state, a second state, or an excited state. The method also includes driving the plurality of matter qubits with one or more pulses that cause a transition from the first state to the excited state. In one example, the pulses cause a matter qubit in the first state to emit a photon through the resonance fluorescence, i.e., the matter qubit is excited to the excited state by the pulses and its decay from the excited state to the first state generates a photon, which corresponds to a first state in the photonic qubit. In this case, the photonic qubit encodes quantum information with presence/absence encoding. This method can be generalized to other encoding methods, such as time-bin, path, or polarization. The method further includes measuring the plurality of matter qubits to teleport the entangled graph state to the plurality of photonic qubits.

Example Embodiments

The techniques presented herein use an array of matter-based qubits as quantum emitters for a photonic resource state. In one example, the matter-based qubits may be cold atomic systems (e.g., neutral atoms or trapped ions), quantum dots, superconducting circuits, or color centers in crystals (e.g., silicon or diamond). The single-shot generator system described herein applies gates to generate a predetermined graph state in the matter-based qubits, and drives the matter-based qubits with a coherent pulse that causes each matter-based qubit to emit a photon based on the internal state of the matter-based photon. Once the matter-based qubits are measured, the graph state is teleported to the outgoing photonic qubits.

Figure 1:
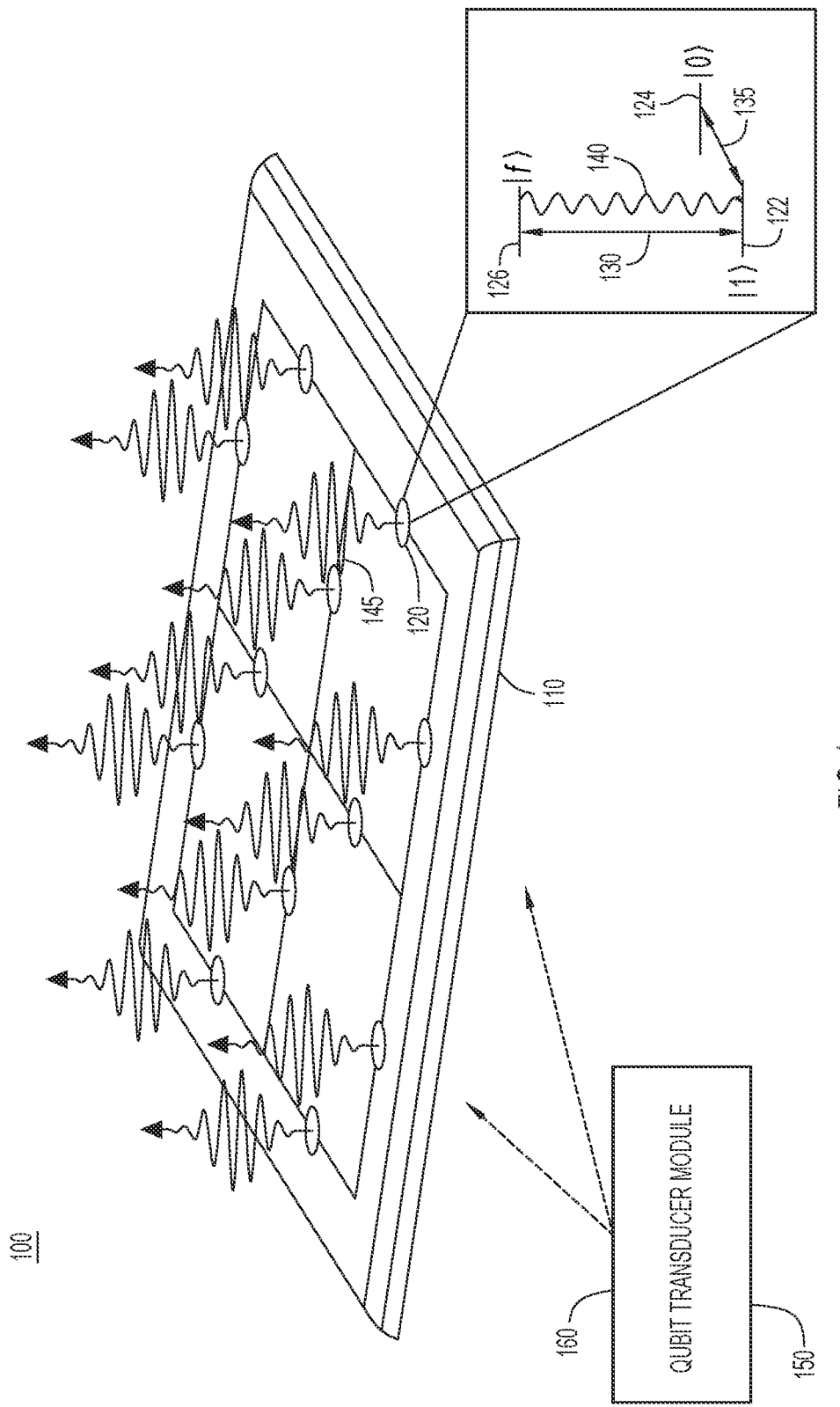
FIG. 1 illustrates the operation of a graph state generator, according to an example embodiment.

Referring now to FIG. 1, the operation of a single-shot graph state generator system 100 is shown. The system 100 includes an array 110 of matter qubits 120, e.g., atomic/ionic qubit systems, quantum dots, superconducting circuits, or color centers in crystals. Each matter qubit 120 has a first state 122 at a first energy level, a second state 124 at a second energy level, and an excited state 126 at a higher energy level. The first state 122 and the second state 124 may define the basis of the matter qubit 120. For instance, the first state 122 may be defined as $|1\rangle$ and the second state 124 may be defined as $|0\rangle$.

The internal state of each matter qubit 120 may transition from the first state 122 to the excited state 126 with an excitation 130 with a first predetermined energy. The internal state of a matter qubit 120 may also transition between the first state 122 and the second state 124 with an excitation 135 of a second predetermined energy. The excited state 126 may be defined as an ephemeral state $|f\rangle$ that decays back to the first state 122 with the emission of a photon 140. In contrast, the matter qubit 120 does not allow a transition directly between the second state 124 and the excited state 126. With the allowed transition from the first state 122 to the excited state 126 and the disallowed transition from the second state 124 to the excited state, the internal state of the matter qubit 120 is transferred to the emitted photonic qubit 145.

The system 100 includes a qubit transducer module 150 that generates one or more pulses 160 with the first predetermined energy that drives the excitation 130. The qubit transducer module 150 drives the array 110 of matter qubits 120 to generate a corresponding array of photonic qubits based on the internal state of each individual matter qubit 120. In one example, the one or more pulses 160 are pulses of microwave energy.

In another example, the qubit transducer module 150 may direct a single pulse 160 that drives all of the matter qubits 120 in the array 110. Alternatively, the qubit transducer module 150 may direct multiple pulses 160 that drive a single matter qubit 120 or a subset of matter qubits out of the array 110. Additionally, the qubit transducer module 150 may direct pulses 160 to different matter qubits 120 at different times to separate the emitted photonic qubits 145 in time.

Figure 2A:
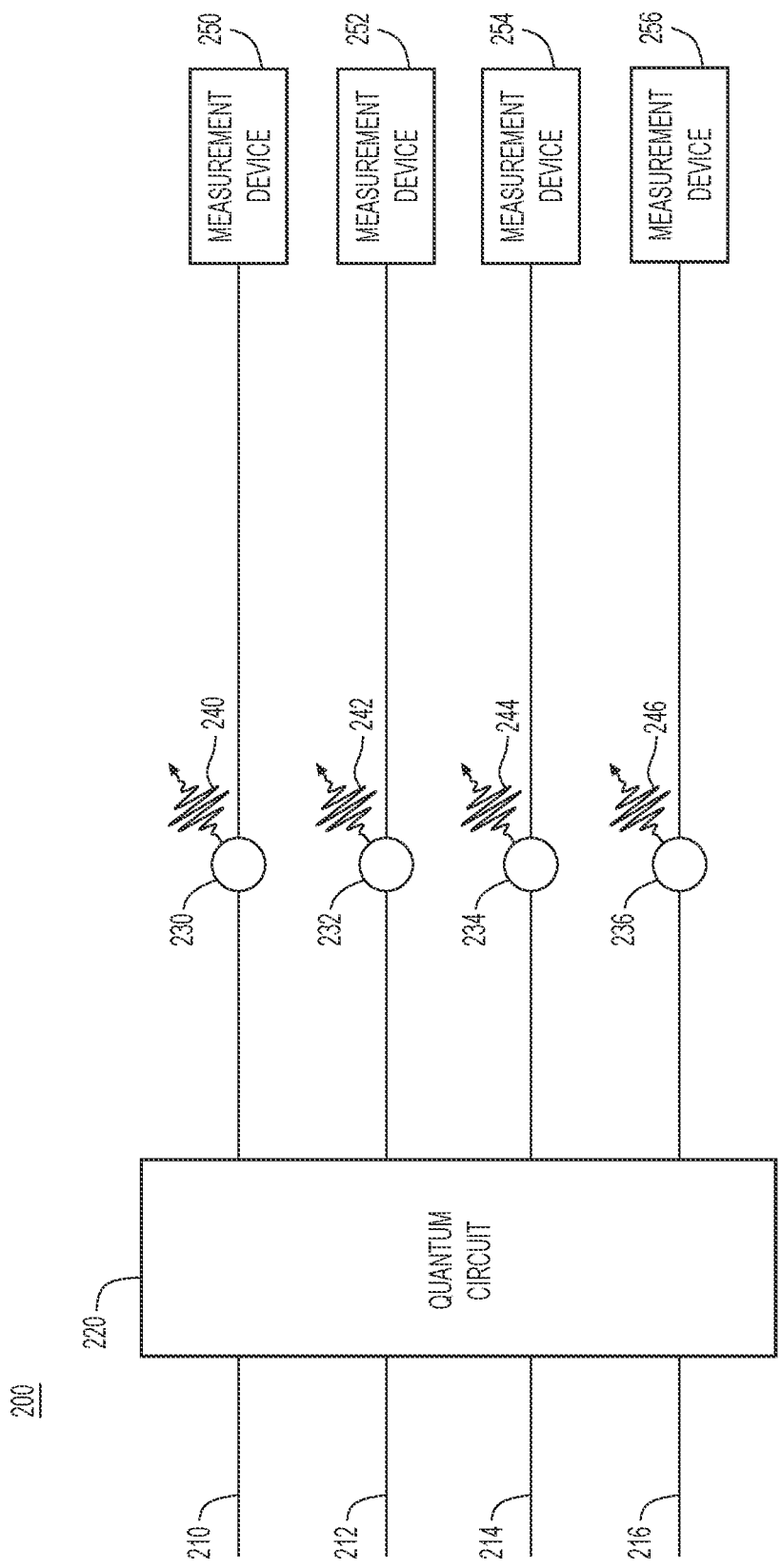
FIG. 2A is a simplified quantum circuit diagram for generating a photonic graph state, according to an example embodiment.

Referring now to FIG. 2A, a simplified quantum circuit diagram 200 illustrates an example of a single-shot graph state generator. The quantum circuit diagram 200 begins with matter qubits 210, 212, 214, and 216 input into a quantum circuit 220. The quantum circuit 220 entangles the states of the separate matter qubits 210, 212, 214, and 216 into an entangled graph state.

After the matter qubits 210, 212, 214, and 216 are entangled by the quantum circuit 220, the matter qubit 210 is driven at 230 to emit a photonic qubit 240 corresponding to the matter qubit 210. Similarly, the matter qubit 212 is driven at 232 to emit a photonic qubit 242 corresponding to the matter qubit 212. The matter qubit 214 is driven at 234 to emit a photonic qubit 244 corresponding to the matter qubit 214, and the matter qubit 216 is driven at 236 to emit a photonic qubit 246 corresponding to the matter qubit 216.

After the system generates the photonic qubit 240, the system measures the matter qubit 210 with a measurement device 250. Similarly, the system measures the matter qubits 212, 214, and 216 with measurement devices 252, 254, and 256 after generating the photonic qubits 242, 244, and 246, respectively. Measuring the matter qubits 210, 212, 214, and 216 effectively teleports the graph state generated by the quantum circuit 220 to the photonic qubits 240, 242, 244, and 246.

Figure 2B:
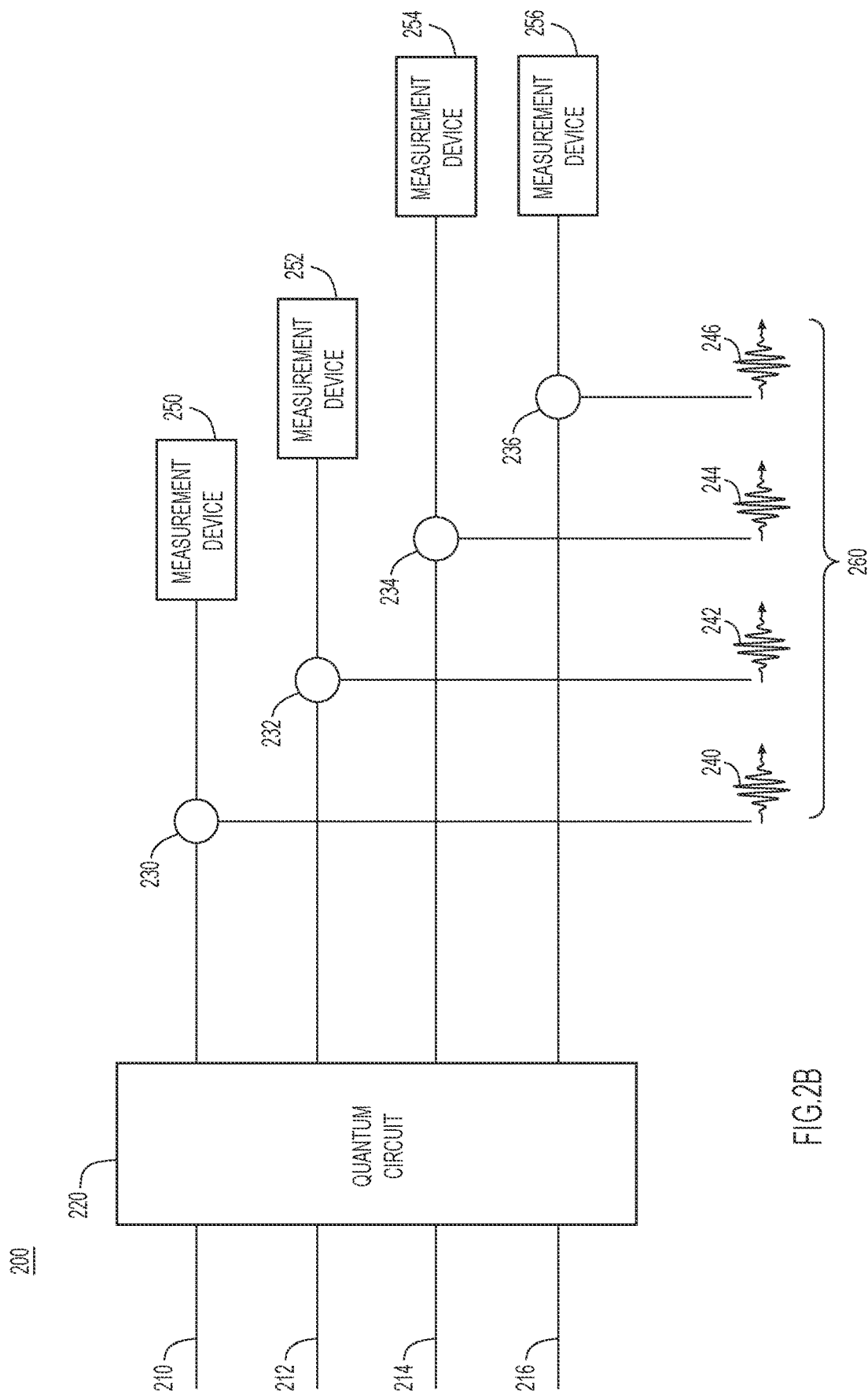
FIG. 2B is a simplified quantum circuit diagram for generating a photonic graph state as a time series of photonic qubits, according to an example embodiment.

Referring now to FIG. 2B, the quantum circuit diagram 200 is modified to generate a time series 260 of photonic qubits 240, 242, 244, and 246. In this example, the matter qubit 210 is driven at 230 first, followed by the matter qubit 212 being driven at 232 after a predetermined amount of time. Similarly, the matter qubits 214 is driven at 234 after another predetermined amount of time and the matter qubit 216 is driven at 236 after a further predetermined amount of time. By staggering when the matter qubits 210, 212, 214, and 216 are driven, the quantum circuit diagram 200 spaces out the photonic qubits 240, 242, 244, and 246 into a time series 260.

The measurement devices 250, 252, 254, and 256 also measure their respective qubits 210, 212, 214, and 216 at different times. In one example, the measurement device 250 may measure the matter qubit 210 before the matter qubit 216 is driven at 236 to generate the photonic qubit 246. In other words, some matter qubits (e.g., matter qubit 210) from the entangled graph state generated by the quantum circuit 220 may be measured before a photonic qubit (e.g., photonic qubit 246) corresponding to a different matter qubit (e.g., matter qubit 216) has been generated. As long as the photonic qubits 240, 242, 244, and 246 are generated after the quantum circuit 220 entangles the matter qubits 210, 212, 214, and 216, the combination of photonic qubits 240, 242, 244, and 246 will incorporate the graph state of the combination of matter qubits 210, 212, 214, and 216.

Figure 3:
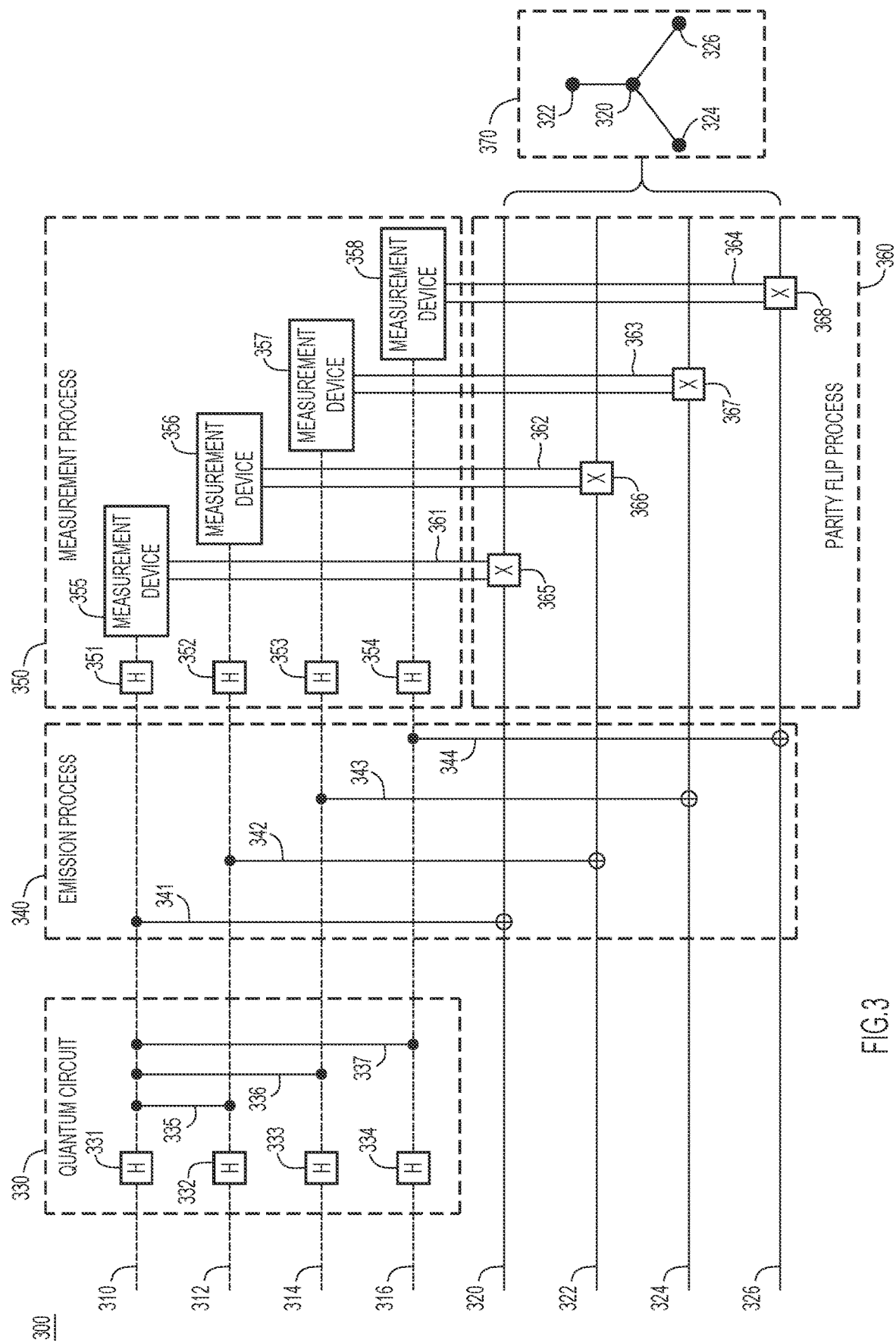
FIG. 3 is a quantum circuit diagram for deterministically generating a photonic graph state with a specified parity, according to an example embodiment.

Referring now to FIG. 3, a quantum circuit diagram 300 illustrates an example of deterministically generating a photonic graph state. The quantum circuit diagram 300 includes matter qubits 310, 312, 314, and 316 which are associated with photonic qubits 320, 322, 324, and 326, respectively. In this example, all of the qubits (i.e., matter qubits 310, 312, 314, 316, and photonic qubits 320, 322, 324, and 324) are generated in a basis state (e.g., |0>). The quantum circuit diagram 300 begins with a quantum circuit 330 that entangles the matter qubits 310, 312, 314, and 316 into a graph state.

The quantum circuit 330 includes Hadamard gates 331, 332, 33, and 334 that operate on the matter qubits 310, 312, 314, and 316, respectively. The Hadamard gates 331, 332, 333, and 334 prepare the matter qubits 310, 312, 314, and 316, which are initially in a basis state (e.g., |0>), into an equal superposition of the basis states $$\left(\text{e.g.,}\ \frac{|0\rangle + |1\rangle}{\sqrt{2}}\ \text{or}\ |+\rangle\right).$$

The quantum circuit 330 also includes a controlled-Z gate 335 that entangles the state of the matter qubit 310 with the state of the matter qubit 312. Similarly, a controlled-Z gate 336 that entangles the state of the matter qubit 310 with the state of the matter qubit 314, and a controlled-Z gate 337 that entangles the state of the matter qubit 310 with the state of the matter qubit 316. The quantum circuit 330 produces a star graph state with the matter qubit 310 at the center connected to each of the matter qubits 312, 314, and 316.

In one example, depending on the implementation of the matter qubits 310, 312, 314, and 316, the controlled-Z gates 335, 336, and 337 may be implemented with a combination of a two-qubit gate (e.g., a CNOT gate) and one-qubit gates (e.g., Pauli gates). Two-qubit gates may be implemented by coupling between two qubits (e.g., the control qubit and the target qubit). The type of coupling for a two-qubit gate may vary depending on the technology of the matter qubits 310, 312, 314, and 316. For instance, capacitive coupling to a waveguide may mediate an interaction between superconducting qubits. In another instance, a Cirac-Zoller gate may couple two matter qubits implemented with trapped ions. In a further instance, quantum dot emitters or color centers may be coupled via driving gating with an electric field, strain field, or microwave pulses.

After the quantum circuit 330 has produced the entangled graph state from the matter qubits 310, 312, 314, and 316, the quantum circuit diagram 300 continues with an emission process 340. The emission process 340 includes a controlled-X gate 341 that links the matter qubit 310 to the photonic qubit 320. In one example, the controlled-X gate 341 may include the application of electromagnetic pulses (e.g., a x-pulse) to the matter qubit 310. The pulse frequency may depend on the implementation of the matter qubits 310, 312, 314, and 316. For instance, a superconducting circuit qubit may be linked to a presence/absence photonic qubit by a microwave pulse. For quantum dot qubits or color center defect qubits, an optical pulse may cause the link to the photonic qubit. Similarly to the controlled-X gate 341, controlled-X gates 342, 343, and 344 link the matter qubits 312, 314, and 316 to the photonic qubits 322, 324, and 326, respectively.

The quantum circuit diagram 300 also includes a measurement process 350 that operates on each of the matter qubits 310, 312, 314, and 316 after each has been through the emission process 340. The measurement process 350 includes a Hadamard gate 351 that operates on the matter qubit 310 to prepare the matter qubit 310 for measurement. Similarly, Hadamard gates 352, 353, and 354 operate on matter qubits 312, 314, and 316, respectively.

After the Hadamard gate 351 has prepared the matter qubit 310, a measurement device 355 makes a measurement of the matter qubit 310. In one example, the measurement device 355 may detect the matter qubit 310 in a |0> state or a |1> state. Similarly, measurement devices 356, 357, and 358 make measurements of the matter qubits 312, 314, and 316, respectively. The measurement process 350 effectively teleports the information from the entangled graph state generated in the matter qubits 310, 312, 314, and 316 by the quantum circuit 330 to the photonic qubits 320, 322, 324, and 326.

The quantum circuit diagram 300 also includes a parity flip process 360 that uses the measurement results from the measurement process 350 to generate a particular graph state. The measurement devices 355, 356, 357, and 358 generate measurement results 361, 362, 363, and 364, respectively. A classically controlled gate 365 operates on the photonic qubit 320 based on the measurement result 361. Similarly, classically controlled gates 366, 367, and 368 operate on the photonic qubits 322, 324, and 326 based on the measurement results 362, 363, and 364, respectively. The classically controlled gates 365, 366, 367, and 368 apply unitary operators (e.g., Pauli operators) on the photonic qubits 320, 322, 324, and 326, respectively, to set the parity of the photonic qubits in the photonic graph state 370 based on the measurement results 361, 362, 363, and 364.

The quantum circuit diagram 300 ends with the photonic graph state 370 comprising photonic qubits 322, 324, and 326 surrounding photonic qubit 320. The photonic graph state 370 is equivalent to the graph state prepared in the matter qubits 310, 312, 314, and 316 by the quantum circuit 330. The photonic graph state 370 may be output for as a resource for measurement-based quantum computing or for quantum networking (e.g., with a quantum error correcting code).

For simplicity of description, the photonic graph state 370 is shown in FIG. 3 as a two-dimensional star graph, but similar techniques may be applied to generate other types of graph states (e.g., tree graphs, mesh graphs, Greenberger-Horne-Zeilinger (GHZ) states, etc.) with arbitrary dimensionality.

In general, the techniques described herein may be used to generate a graph state G with V nodes a E edges, which is described by stabilizers:

$$S_i = X_i \prod_{(i,j) \in E} Z_j = 1$$

A quantum circuit (e.g., quantum circuit 220) operates on matter-based qubits to generate:

$$S_i^{(q)} = X_{qi} \prod_{(i,j) \in E} Z_{qj} = 1$$

The emission process (e.g., emission process 340) generates new stabilizers:

$$S_i^{(q)'} = X_{qi} X_{pi} \prod_{(i,j) \in E} Z_{qj} = 1, S_i^{(p,q)} = Z_{qi} Z_{pi} = 1$$

Measuring the matter-based qubits $X_{qi}$ leads to:

$$S_i^{(p)} = X_{pi} \prod_{(i,j) \in E} Z_{pj} = X_{qi} S_i^{(q)'} \prod_{(i,j) \in E} S_j^{(p,q)} = \pm 1$$

Since $X_{qi} = \pm 1$ after the measurement. This describes the same graph generated in the matter qubits with a potential parity flip. The parity of the graph state may be adjusted based on the measurement results of the matter qubits.

Figure 4:
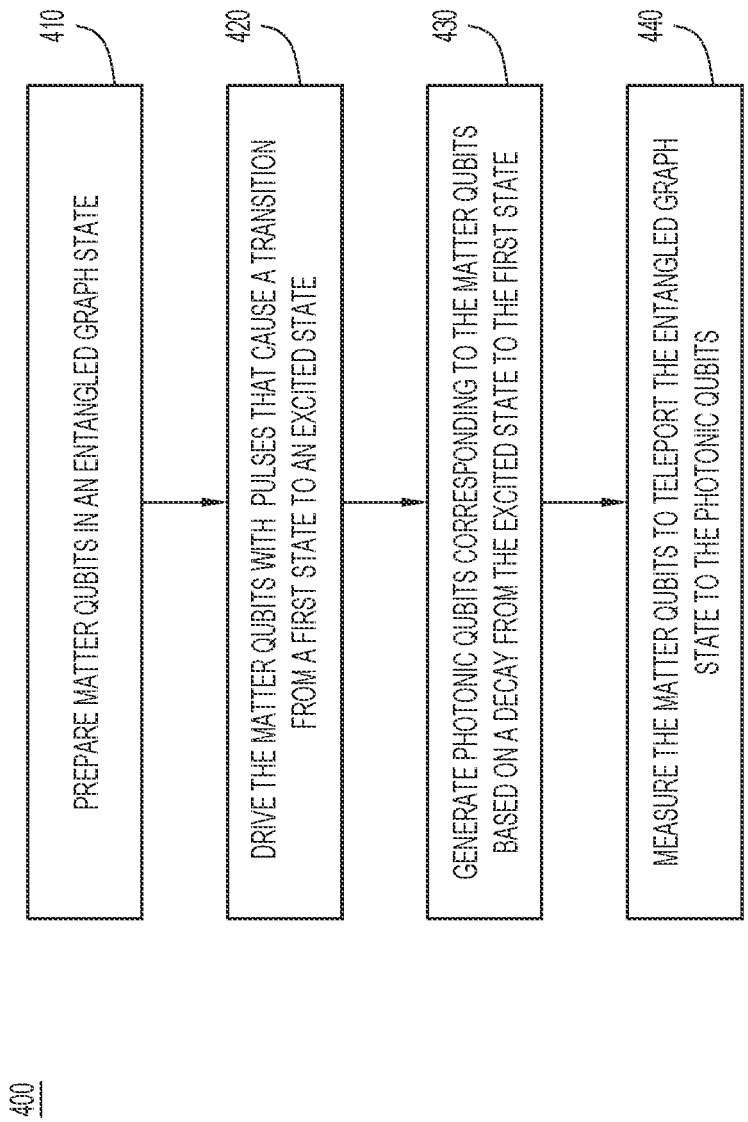
FIG. 4 is a flowchart illustrating operations performed by a graph state generator to transform a graph state in matter-based qubits to a photonic graph state for use in measurement-based quantum techniques, according to an example embodiment.

Referring now to FIG. 4, a flowchart illustrates an example process 400 performed by a graph generator (e.g., single-shot graph state generator system 100) to generate a photonic graph state. At 410, the system prepares a plurality of matter qubits in an entangled graph state. The matter qubits may be based on any type of material (e.g., trapped ions, neutral atoms, superconducting circuits, or color centers in crystal structures) with definable long-lived quantum states. In one example, each matter qubit of the plurality of matter qubits has a first state at a first energy level, a second state at a second energy level, and an excited state at a higher energy level. In another example, the system may prepare the entangled graph state by applying a predetermined quantum circuit to the plurality of matter qubits.

At 420, the system drives the matter qubits with one or more pulses that cause a transition from the first state to the excited state. In one example, a single pulse sequence may be directed to all of the matter qubits to drive all of the matter qubits essentially simultaneously. Alternatively, individual matter qubits or smaller groups of matter qubits may be targeted with pulses at the same time or at different times. In another example, the pulses may be pulses of microwave energy with sufficient energy to drive a matter qubit from the first state to the excited state.

At 430, the system generates photonic qubits corresponding to each matter qubits based on a decay from the excited state to the first state. In one example, the one or more of the photonic qubits may be generated before matter qubits corresponding to other photonic qubits are driven to the excited state. As long as the matter qubits have all been prepared in the entangled graph state prior to any of the matter qubits being driven to emit a photonic qubit, the system may generate the photonic qubits in any order. For instance, the matter qubits may be driven in a time sequence to generate the photonic qubits as a sequence of time-separated photonic qubits.

At 440, the system measures the matter qubits to teleport the entangled graph state to the photonic qubits. In one example, the system uses the measurement results from the matter qubits to determine the parity of the state of the photonic qubits in the entangled graph state. The system may also flip the state of an individual photonic qubit based on the measurement result of the corresponding matter qubit to ensure that the parity of the photonic qubit in the entangled graph state matches the matter qubit in the prepared graph state.

Figure 5:
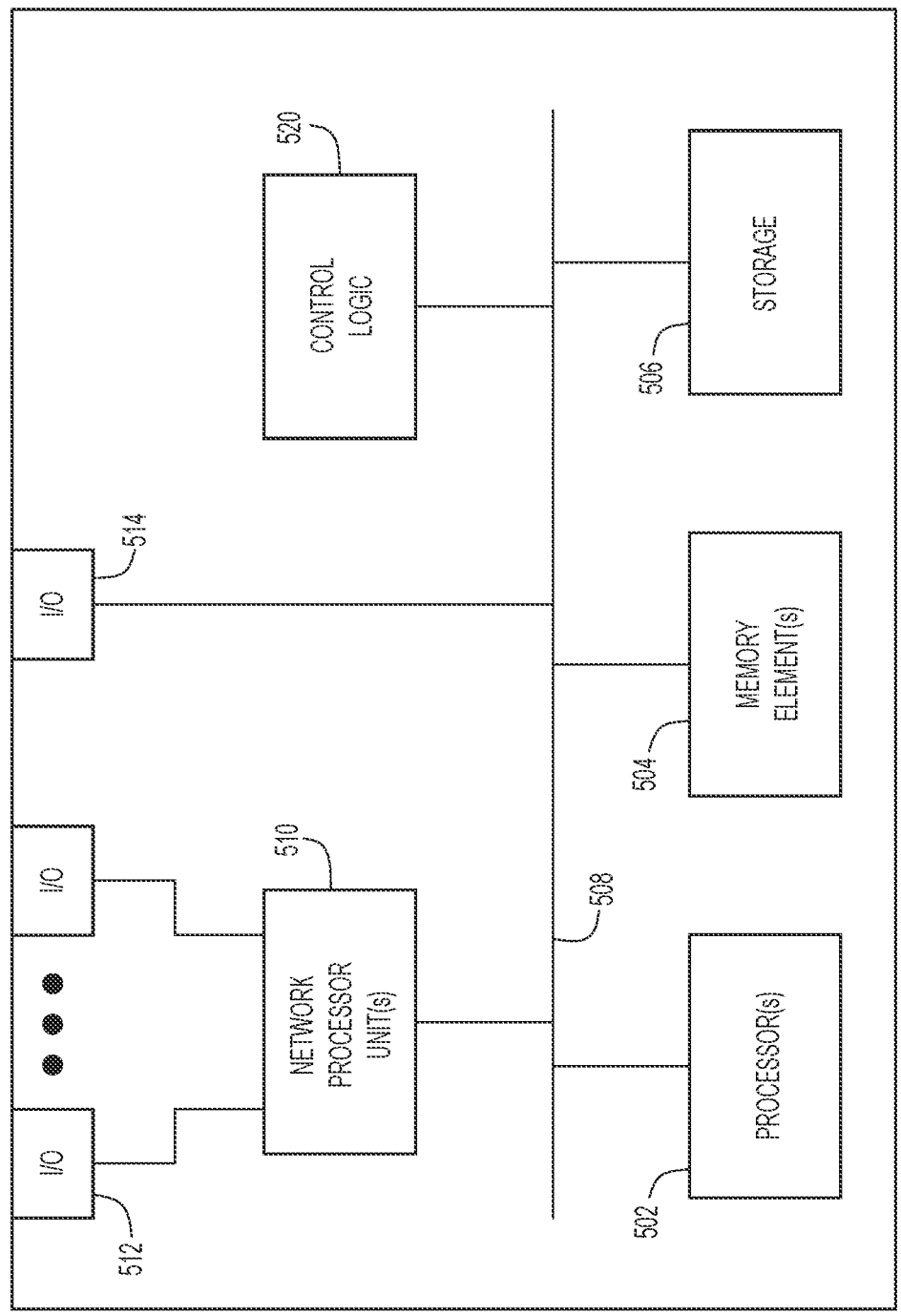
FIG. 5 is a block diagram of a computing device that may be configured to perform the techniques presented herein, according to an example embodiment.

Referring to FIG. 5, FIG. 5 illustrates a hardware block diagram of a computing device 500 that may perform functions associated with operations discussed herein in connection with the techniques depicted in FIGS. 1, 2A, 2B, 3, and 4. In various embodiments, a computing device, such as computing device 500 or any combination of computing devices 500, may be configured as any entity/entities as discussed for the techniques depicted in connection with FIGS. 1, 2A, 2B. 3, and 4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information, classical bits, qubits) from one state or thing to another state or thing. Any of potential classical processing elements, quantum processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store quantum data, classical data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a classical network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store classical data/information or quantum data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), light quantum memory, solid quantum memory, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store classical data, quantum data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In summary, the techniques presented herein use an array of matter-based qubits as a basis for generating photonic graph states that may be used in optical quantum information processing. Deterministically manipulating the matter-based qubits with known logic gates provides a more effective and efficient way to generate an entangled graph state. Once the entangled graph state is prepared in the matter-based qubits, the matter-based qubits are excited in a single shot to generate the photonic qubits, which can be placed in the same entangled graph state without directly manipulating photons. The single-shot graph state generator leverages the logic gates of the matter-based qubits, which are more efficient that photonic logic gates, to generate a photonic graph state.

In some aspects, the techniques described herein relate to a method including: preparing a plurality of matter qubits in an entangled graph state, each matter qubit of the plurality of matter qubits having a first state, a second state, and an excited state; driving the plurality of matter qubits with one or more pulses that cause a transition from the first state to the excited state; generating a plurality of photonic qubits corresponding to the plurality of matter qubits, each photonic qubit generated based on a decay of a corresponding matter qubit from the excited state to the first state; and measuring the plurality of matter qubits to teleport the entangled graph state to the plurality of photonic qubits.

In some aspects, the techniques described herein relate to a method, wherein driving the plurality of matter qubits includes directing at least one microwave pulse toward the plurality of matter qubits, wherein the at least one microwave pulse is of a predetermined energy corresponding to the transition from the first state to the excited state.

In some aspects, the techniques described herein relate to a method, wherein driving the plurality of matter qubits includes driving all of the matter qubits in the plurality of matter qubits with the at least one microwave pulse substantially simultaneously.

In some aspects, the techniques described herein relate to a method, wherein driving the plurality of matter qubits includes directing a plurality of individual pulses toward the plurality of matter qubits, wherein each individual pulse among the plurality of individual pulses is directed to a corresponding matter qubit among the plurality of matter qubits.

In some aspects, the techniques described herein relate to a method, wherein each individual pulse among the plurality of individual pulses is directed to the corresponding matter qubit at a different time to generate the plurality of photonic qubits as a time series of photonic qubits.

In some aspects, the techniques described herein relate to a method, wherein a first matter qubit among the plurality of matter qubits corresponding to a first photonic qubit among the plurality of photonic qubits is measured before a second photonic qubit among the plurality of photonic qubits is generated from a corresponding second matter qubit among the plurality of matter qubits.

In some aspects, the techniques described herein relate to a method, further including applying a unitary operator to one or more photonic qubit of the plurality of photonic qubits based on a measurement result from measuring the plurality of matter qubits.

In some aspects, the techniques described herein relate to a method, wherein the unitary operator is a Pauli operator.

In some aspects, the techniques described herein relate to a method, wherein the entangled graph state is a stabilizer state of a predetermined stabilizer code.

In some aspects, the techniques described herein relate to a method, wherein the plurality of matter qubits are based on neutral atoms, trapped ions, quantum dots, color centers in crystals, or superconducting circuits.

In some aspects, the techniques described herein relate to a system including: a quantum circuit configured to prepare a plurality of matter qubits in an entangled graph state, each matter qubit of the plurality of matter qubits having a first state, a second state, and an excited state; a qubit transducer module configured to generate a plurality of photonic qubits corresponding to the plurality of matter qubits by driving the plurality of matter qubits with one or more pulses that causes a transition from the first state to the second state, wherein each photonic qubit of the plurality of photonic qubits is generated based on a decay of a corresponding matter qubit from the excited state to the first state; and a measurement module configured to measure the plurality of matter qubits to teleport the entangled graph state to the plurality of photonic qubits.

In some aspects, the techniques described herein relate to a system, wherein the qubit transducer module is configured to drive the plurality of matter qubits by directing at least one microwave pulse toward the plurality of matter qubits, wherein the at least one microwave pulse is of a predetermined energy corresponding to the transition from the first state to the excited state.

In some aspects, the techniques described herein relate to a system, wherein the qubit transducer module is further configured to drive the plurality of matter qubits by driving all of the matter qubits in the plurality of matter qubits with the at least one microwave pulse substantially simultaneously.

In some aspects, the techniques described herein relate to a system, wherein the qubit transducer module is further configured to drive the plurality of matter qubits by directing a plurality of individual pulses toward the plurality of matter qubits, wherein each individual pulse among the plurality of individual pulses is directed to a corresponding matter qubit among the plurality of matter qubits.

In some aspects, the techniques described herein relate to a system, wherein the qubit transducer module is further configured to direct each individual pulse among the plurality of individual pulses to the corresponding matter qubit at a different time to generate the plurality of photonic qubits as a time series of photonic qubits.

In some aspects, the techniques described herein relate to a system, wherein the measurement module is configured to measure a first matter qubit among the plurality of matter qubits corresponding to a first photonic qubit among the plurality of photonic qubits before the qubit transducer module generates a second photonic qubit among the plurality of photonic qubits from a corresponding second matter qubit among the plurality of matter qubits.

In some aspects, the techniques described herein relate to a system, wherein the qubit transducer module is further configured to apply a unitary operator to one or more photonic qubit of the plurality of photonic qubits based on a measurement result from the measurement module measuring the plurality of matter qubits.

In some aspects, the techniques described herein relate to a system, wherein the unitary operator is a Pauli operator.

In some aspects, the techniques described herein relate to a system, wherein the quantum circuit is configured to prepare the plurality of matter qubits in the entangled graph state as a stabilizer state of a predetermined stabilizer code.

In some aspects, the techniques described herein relate to a system, wherein the plurality of matter qubits are based on neutral atoms, trapped ions, quantum dots, color centers in crystals, or superconducting circuits.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   preparing a plurality of matter qubits in an entangled graph state, each matter qubit of the plurality of matter qubits having a first state, a second state, and an excited state;
   driving the plurality of matter qubits with one or more pulses that cause a transition from the first state to the excited state;
   generating a plurality of photonic qubits corresponding to the plurality of matter qubits, each photonic qubit generated based on a decay of a corresponding matter qubit from the excited state to the first state; and
   measuring the plurality of matter qubits to teleport the entangled graph state to the plurality of photonic qubits.

2. The method of claim 1, wherein driving the plurality of matter qubits comprises directing at least one microwave pulse toward the plurality of matter qubits, wherein the at least one microwave pulse is of a predetermined energy corresponding to the transition from the first state to the excited state.

3. The method of claim 2, wherein driving the plurality of matter qubits comprises driving all of the matter qubits in the plurality of matter qubits with the at least one microwave pulse substantially simultaneously.

4. The method of claim 1, wherein driving the plurality of matter qubits comprises directing a plurality of individual pulses toward the plurality of matter qubits, wherein each individual pulse among the plurality of individual pulses is directed to a corresponding matter qubit among the plurality of matter qubits.

5. The method of claim 4, wherein each individual pulse among the plurality of individual pulses is directed to the corresponding matter qubit at a different time to generate the plurality of photonic qubits as a time series of photonic qubits.

6. The method of claim 1, wherein a first matter qubit among the plurality of matter qubits corresponding to a first photonic qubit among the plurality of photonic qubits is measured before a second photonic qubit among the plurality of photonic qubits is generated from a corresponding second matter qubit among the plurality of matter qubits.

7. The method of claim 1, further comprising applying a unitary operator to one or more photonic qubit of the plurality of photonic qubits based on a measurement result from measuring the plurality of matter qubits.

8. The method of claim 7, wherein the unitary operator is a Pauli operator.

9. The method of claim 1, wherein the entangled graph state is a stabilizer state of a predetermined stabilizer code.

10. The method of claim 1, wherein the plurality of matter qubits are based on neutral atoms, trapped ions, quantum dots, color centers in crystals, or superconducting circuits.

11. A system comprising:
    a quantum circuit configured to prepare a plurality of matter qubits in an entangled graph state, each matter qubit of the plurality of matter qubits having a first state, a second state, and an excited state;
    a qubit transducer module configured to generate a plurality of photonic qubits corresponding to the plurality of matter qubits by driving the plurality of matter qubits with one or more pulses that cause a transition from the first state to the second state, wherein each photonic qubit of the plurality of photonic qubits is generated based on a decay of a corresponding matter qubit from the excited state to the first state; and
    a measurement module configured to measure the plurality of matter qubits to teleport the entangled graph state to the plurality of photonic qubits.

12. The system of claim 11, wherein the qubit transducer module is configured to drive the plurality of matter qubits by directing at least one microwave pulse toward the plurality of matter qubits, wherein the at least one microwave pulse is of a predetermined energy corresponding to the transition from the first state to the excited state.

13. The system of claim 12, wherein the qubit transducer module is further configured to drive the plurality of matter qubits by driving all of the matter qubits in the plurality of matter qubits with the at least one microwave pulse substantially simultaneously.

14. The system of claim 11, wherein the qubit transducer module is further configured to drive the plurality of matter qubits by directing a plurality of individual pulses toward the plurality of matter qubits, wherein each individual pulse among the plurality of individual pulses is directed to a corresponding matter qubit among the plurality of matter qubits.

15. The system of claim 14, wherein the qubit transducer module is further configured to direct each individual pulse among the plurality of individual pulses to the corresponding matter qubit at a different time to generate the plurality of photonic qubits as a time series of photonic qubits.

16. The system of claim 11, wherein the measurement module is configured to measure a first matter qubit among the plurality of matter qubits corresponding to a first photonic qubit among the plurality of photonic qubits before the qubit transducer module generates a second photonic qubit among the plurality of photonic qubits from a corresponding second matter qubit among the plurality of matter qubits.

17. The system of claim 11, wherein the qubit transducer module is further configured to apply a unitary operator to one or more photonic qubit of the plurality of photonic qubits based on a measurement result from the measurement module measuring the plurality of matter qubits.

18. The system of claim 17, wherein the unitary operator is a Pauli operator.

19. The system of claim 11, wherein the quantum circuit is configured to prepare the plurality of matter qubits in the entangled graph state as a stabilizer state of a predetermined stabilizer code.

20. The system of claim 11, wherein the plurality of matter qubits are based on neutral atoms, trapped ions, quantum dots, color centers in crystals, or superconducting circuits.

* * * * *